(12) United States Patent
Harvey et al.

(10) Patent No.: US 7,632,062 B2
(45) Date of Patent: Dec. 15, 2009

(54) TURBINE ROTOR BLADES

(75) Inventors: Neil W Harvey, Derby (GB); Ian Tibbott, Lichfield (GB)

(73) Assignee: Rolls-Royce plc, London (GB)

( * ) Notice: Subject to any disclaimer, the term of this patent is extended or adjusted under 35 U.S.C. 154(b) by 511 days.

(21) Appl. No.: 11/082,665

(22) Filed: Mar. 18, 2005

(65) Prior Publication Data
US 2005/0232771 A1 Oct. 20, 2005

(30) Foreign Application Priority Data
Apr. 17, 2004 (GB) .................................. 0408604.7

(51) Int. Cl.
*F01D 5/18* (2006.01)

(52) U.S. Cl. ....................... 415/115; 415/173.1; 416/92; 416/97 R

(58) Field of Classification Search ............... 416/96 R, 416/96 A, 97 R, 92, 224; 415/115–116, 173.1, 415/173.4, 173.5, 173.6
See application file for complete search history.

(56) References Cited

U.S. PATENT DOCUMENTS

| | | | |
|---|---|---|---|
| 2,963,268 A | | 12/1960 | Smile |
| 4,142,824 A | | 3/1979 | Andersen |
| 4,487,550 A | | 12/1984 | Horvath |
| 4,589,823 A | * | 5/1986 | Koffel .......................... 416/92 |
| 5,531,568 A | * | 7/1996 | Broadhead ................ 416/97 R |
| 5,564,902 A | * | 10/1996 | Tomita ..................... 416/97 R |
| 5,660,523 A | * | 8/1997 | Lee ........................... 416/97 R |
| 5,733,102 A | * | 3/1998 | Lee et al. .................. 416/97 R |
| 6,142,739 A | * | 11/2000 | Harvey .................... 415/173.1 |
| 6,179,556 B1 | * | 1/2001 | Bunker ....................... 415/115 |
| 6,916,150 B2 | * | 7/2005 | Liang ......................... 415/115 |
| 6,971,851 B2 | * | 12/2005 | Liang ...................... 416/97 R |

FOREIGN PATENT DOCUMENTS

| | | | | |
|---|---|---|---|---|
| EP | 0 684 364 A | | 11/1995 | |
| EP | 0 801 209 A | | 7/1999 | |
| GB | 2 290 833 A | | 1/1996 | |
| GB | 2 298 246 A | | 8/1996 | |
| GB | 2 322 167 A | | 8/1998 | |
| JP | 62223402 SP | | 10/1987 | |
| JP | 2-23201 A | * | 1/1990 | ............... 416/96 A |

* cited by examiner

*Primary Examiner*—Christopher Verdier
(74) *Attorney, Agent, or Firm*—Jeffrey S. Melcher; Manelli Denison & Selter PLLC

(57) ABSTRACT

A rotor blade tip arrangement is provided in which winglets extend from the end of rotor blade aerofoil walls. These winglets incorporate passages which extend to coolant apertures or holes in order to present a coolant flow about the tip of the turbine rotor blade. The winglets define at least an open ended gutter channel in order to inhibit leakage flow across the tip arrangement from a pressure side P to a suction side S. The coolant flow facilitates cooling of the arrangement despite any heating caused by leakage flow across the arrangement.

18 Claims, 7 Drawing Sheets

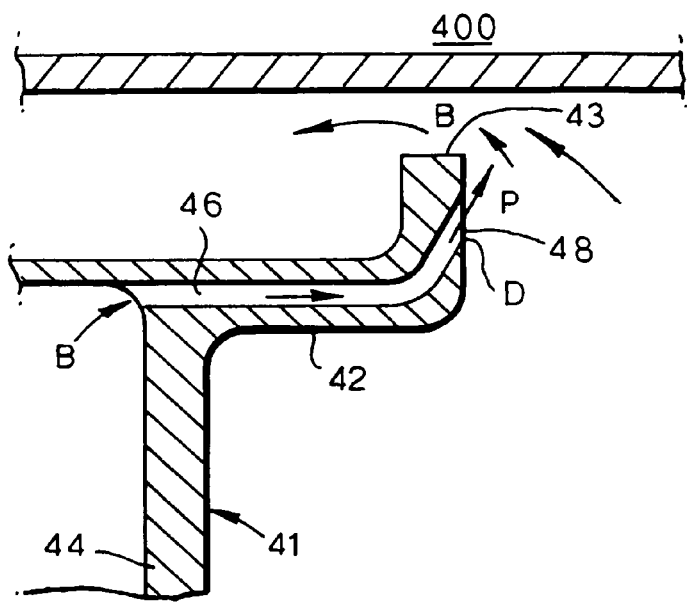
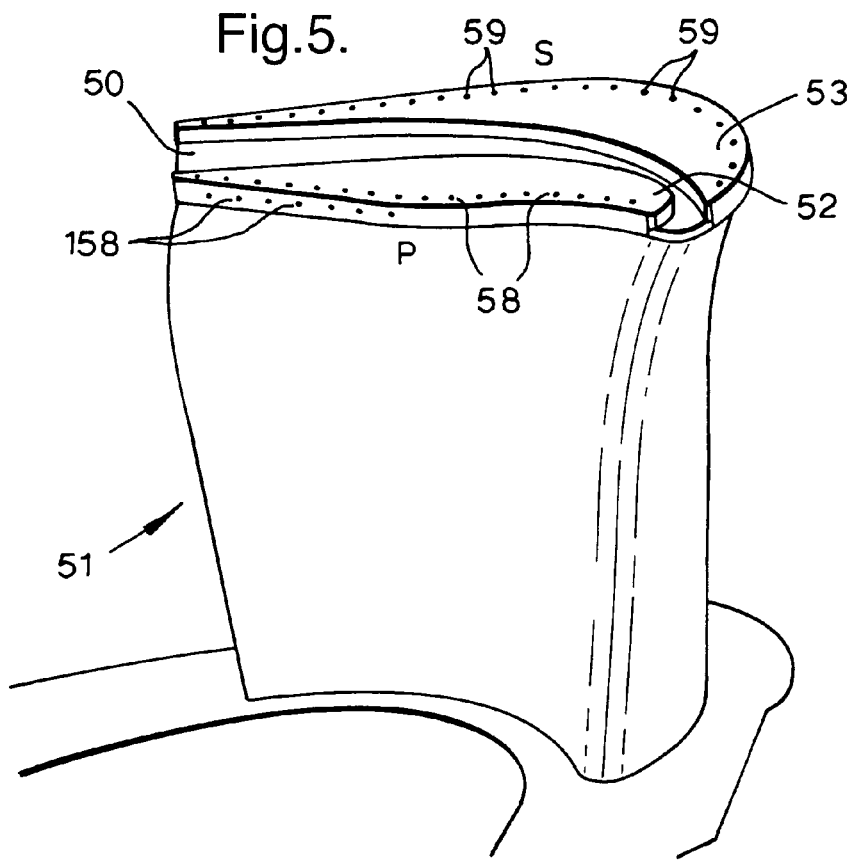

TURBINE ROTOR BLADES

FIELD OF THE INVENTION

The present invention relates to turbine rotor blades and more particularly to the rotor tip arrangements of those turbine rotor blades.

BACKGROUND OF THE INVENTION

Operation of turbine engines is well known. Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produces two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

In view of the above it will be appreciated that there is leakage about the peripheral tips of rotor blades of the turbines 16, 17 and 18 during operation and this leakage reduces efficiency with regard to the engine as well as causing heating problems due to the hot combustion gas nature of the leakage flow about the tip. It is known to inhibit leakage using shrouds on either side of the rotor tip, but generally such shrouding adds significantly to weight and therefore is impractical within most turbine engines particularly if utilised in aircraft. Unshrouded rotor tip leakage prevention is also known, and an example is outlined in U.S. Pat. No. 6,142,739 (Rolls Royce plc). Essentially, in this unshrouded rotor tip, a gutter is defined at the tip within which leakage flow is captured. Such leakage capture is normally through induced vortex effects. Nevertheless, as indicated previously, such captured leakage will generally be of a hot combustion gas such that there may be significant heating problems with respect to turbine tips which in themselves are generally formed from thinner sections of material.

Modern gas turbines operate with high turbine entry temperatures to achieve high thermal efficiencies. These temperatures are limited by the turbine vane and blade materials. Cooling of these components is now needed to allow their operating temperatures to exceed the material's melting point without affecting the vane and blade integrity.

A large number of cooling systems are now applied to modern high temperature gas turbine vanes and blades. Cooling is achieved using relatively cool air bled from the upstream compressor system and is arranged to bypass the combustion chamber between the last compressor stage and first turbine stage. This air is introduced into the turbine vanes and blades where cooling is effected by a combination of internal convective cooling and external film cooling.

In film cooling a protective blanket of cooling air is ejected onto the external surface of the turbine vane or blade, from internal passages within the aerofoils, by means of holes or slots in the surface. The aim is to minimise the external heat transfer from the hot gas stream into the component surface.

In convective cooling the air is passed through passages within the aerofoil which cools the metal since the air temperature is below that of the metal. Effectively the turbine component itself acts as a heat exchanger.

U.S. Pat. No. 6,142,739 (Rolls-Royce plc) illustrates one unshrouded turbine blade tip. In short, a gutter is provided along the top of that tip. FIG. 2 provides a simple isometric view of a rotor blade tip of a so called partial shroud or winglet type. Essentially, a rotor blade 20 has a blunt trailing edge 21 and the partial shroud 22 everywhere lies outside the envelope of the rotor blade 20 aerofoil beneath it. An internal or gutter channel 23 is provided which extends from a leading edge 24 to the trailing edge 21. This channel 23 is open at both ends and widens from a leading edge 24 to the trailing edge 21. The open ends to the channel 23 are provided in order to initiate cross-flow to enter to the gutter channel 23. It should be appreciated that the opening at the leading edge 24 to the gutter channel 23 provides an additional leakage path and so is kept as small as possible.

Of importance with regard to the present invention is that some of the leakage flow remains within the internal gutter channel 23 and does not reach the suction side S. Operationally this is important as it prevents mixing with the high velocity main turbine stream flow on the suction side S which would result in high aerodynamic losses. Unfortunately, lingering of leakage flows within the gutter channel 23 as indicated causes significant heating problems, etc.

SUMMARY OF THE INVENTION

In accordance with the present invention there is provided a rotor blade tip arrangement comprising a channel extending along a tip edge in order to inhibit leakage flow laterally across that channel in use, the channel being defined by upstanding winglets with the channel between them and the winglets including apertures to present a coolant flow to mingle with any leakage flow drawn across the channel. The rotor blade having an airfoil portion wherein the rotor blade has an axis from the airfoil portion to the tip edge.

Typically, the apertures are upstanding within the winglets wherein the winglets extend laterally, with respect to the axis, from the airfoil portion tip edge. Alternatively, the apertures extend laterally or horizontally across the winglets. Further alternatively, the apertures are inclined relative to the channel.

Normally the apertures are coupled to a passage matrix within the arrangement connected to a coolant root network.

Advantageously the arrangement includes a side cavity or trench to one side of the channel defined by a cavity winglet. Normally, the cavity winglet includes apertures to present coolant flow to mingle with any leakage flow across that side cavity or trench.

Typically, the channel and/or the cavity or trench incorporate heat transfer means. Generally, the heat transfer means comprises a coating and/or ribs in the surface of the channel or cavity to facilitate heat transfer to the coolant/leakage flow.

Also, in accordance with the present invention there is provided a rotor blade assembly comprising a rotor blade tip arrangement as described above adjacent to a casing and the apertures in the arrangement orientated towards that casing in order to present a coolant flow which pinches any leakage flow laterally across the arrangement.

Generally, the coolant flow cools upon impingement with the casing.

Additionally in accordance with the present invention there is provided a turbine engine incorporating a rotor blade tip arrangement or rotor blade assembly as described above.

DESCRIPTION OF THE DRAWINGS

Embodiments of the present invention will now be described by way of example and with reference to the accompanying drawings in which:

FIG. 4 is a schematic part cross-section of a rotor tip arrangement in accordance with a second embodiment of the present invention;

FIG. 5 is a schematic perspective view of a rotor blade, and in particular a rotor blade tip arrangement in accordance with the present invention;

DETAILED DESCRIPTION OF THE INVENTION

The present invention utilises cooling air typically available within a turbine engine and through an appropriate passage network or matrix within each turbine rotor aerofoil. The number of passages and their inter relationship will be provided in order to achieve positive cooling of the turbine blade or rotor through convection, and in accordance with the present invention, the warmed coolant air is then utilised with respect to coolant film effect and leakage flow control at the turbine rotor tip.

Figure 1:
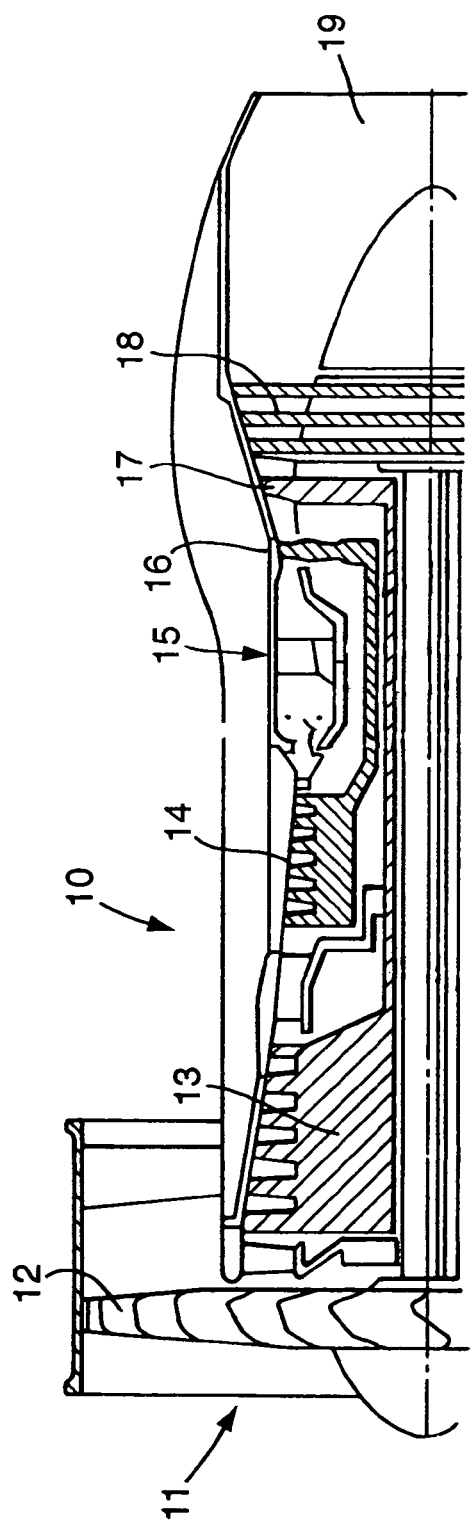
FIG. 1 is a schematic sectional view of a gas turbine engine.
Figure 2:
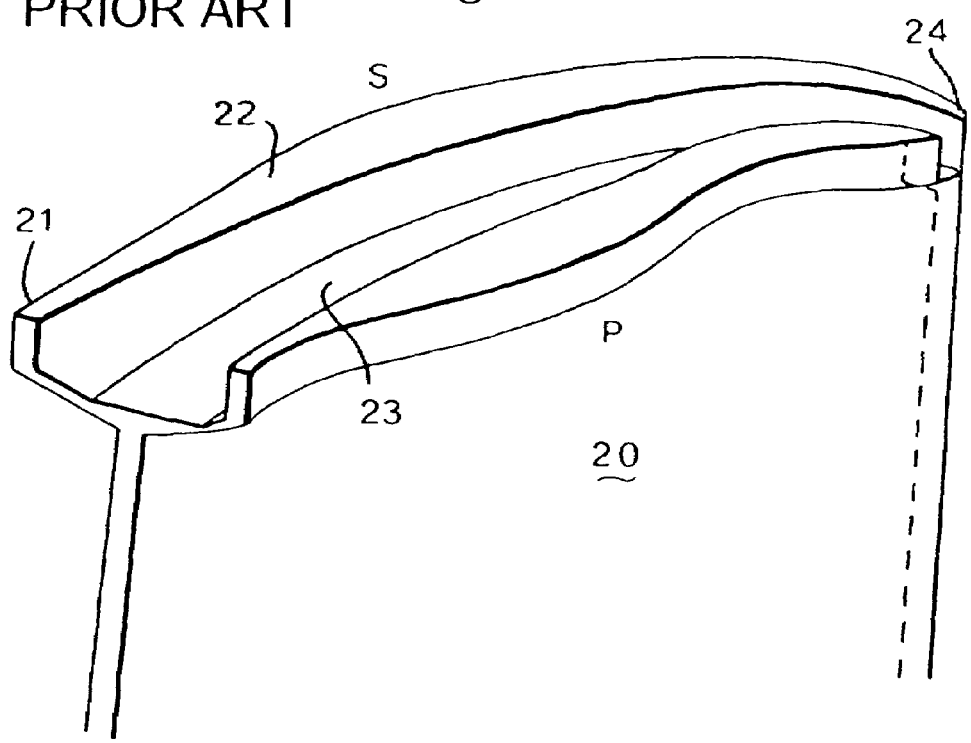
FIG. 2 is a schematic perspective view of a rotor blade, and in particular a prior art rotor blade tip arrangement.
Figure 3A:
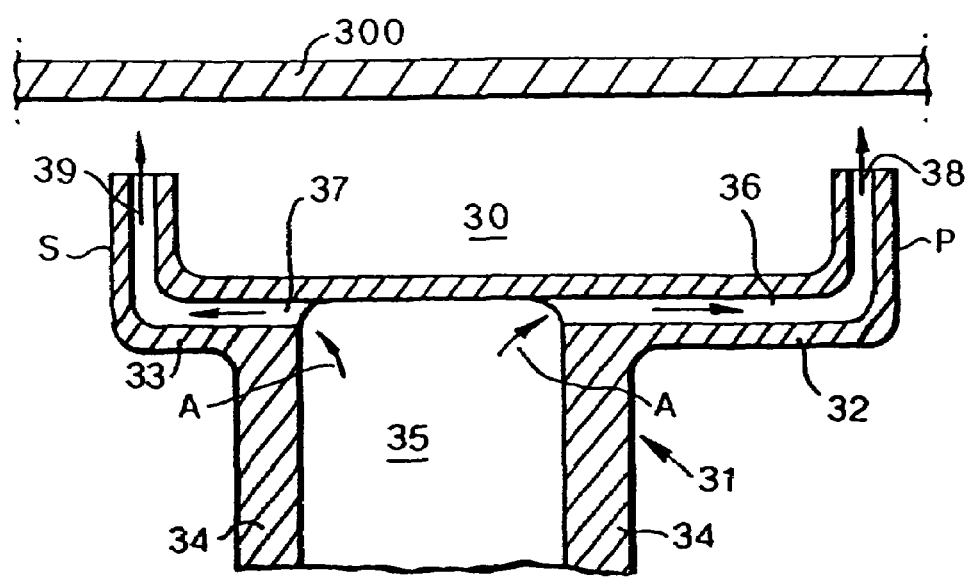
FIG. 3A is a schematic cross-section of a rotor blade tip arrangement in accordance with a first embodiment of the present invention.

FIG. 3 illustrates a first embodiment of the rotor tip arrangement 31 in accordance with the present invention. The arrangement 31 incorporates winglets 32, 33 which extend laterally from aerofoil walls 34. Within the rotor blade aerofoil there is an internal root passage 35 which supplies coolant air in the direction of arrowheads A to passages 36, 37 within the winglets 32, 33. These passages 36, 37 extend to apertures 38, 39 to project coolant air flow outwardly. As can be seen the winglets 32, 33 include upstanding sections which define a gutter channel 30. In the above circumstances, it will be appreciated that the general configuration of the rotor tip arrangement 31 is similar to that depicted in FIG. 2 except for the features as outlined below.

Coolant air A is taken from the main aerofoil passage 35 through horizontal holes in the base of each winglet 32, 33.

The coolant air is ejected at the end of passages through apertures 38, 39. The apertures 38, 39 may continue up the sides of the winglets 32, 33 either radially or at an angle to the radial direction.

The cooling apertures 38, 39 provide local convective cooling within the base and sides of the winglets 32, 33.

The apertures 38, 39 allow ejection of coolant air at the tip of each side of each winglet 32,33. Depending on the local pressure drop across this side (i.e. normal to the ejected flow) this coolant flow may have enough velocity to impinge on a stationary casing 300 and provide positive cooling to that casing 300 as the rotor rotates around. Using the coolant air for both convective and then impingement cooling in this way is very efficient. A particular feature of arrangement 31 is the cooling provided to the pressure side P of the winglet 32. The main gas turbine stream flow that leaks over the tip enters the gap between rotor aerofoil tip end and casing on the pressure side P. Typically this means the pressure side P corner experiences high heat transfer (due to high heat transfer coefficients and possibly hot gas migrating to this region). Providing positive cooling here is very beneficial to maintaining the integrity of the winglet 32 and avoiding degradation.

Where the cooling holes 38, 39 in the side of the winglet are (largely) radial, convective cooling is provided all the way to the tip. Where cooling air is ejected on the pressure surface side P of the winglet 32 the coolant flows radially upwards providing some surface film cooling and then mixes with the over tip leakage flow to dilute its temperature.

Figure 3B:
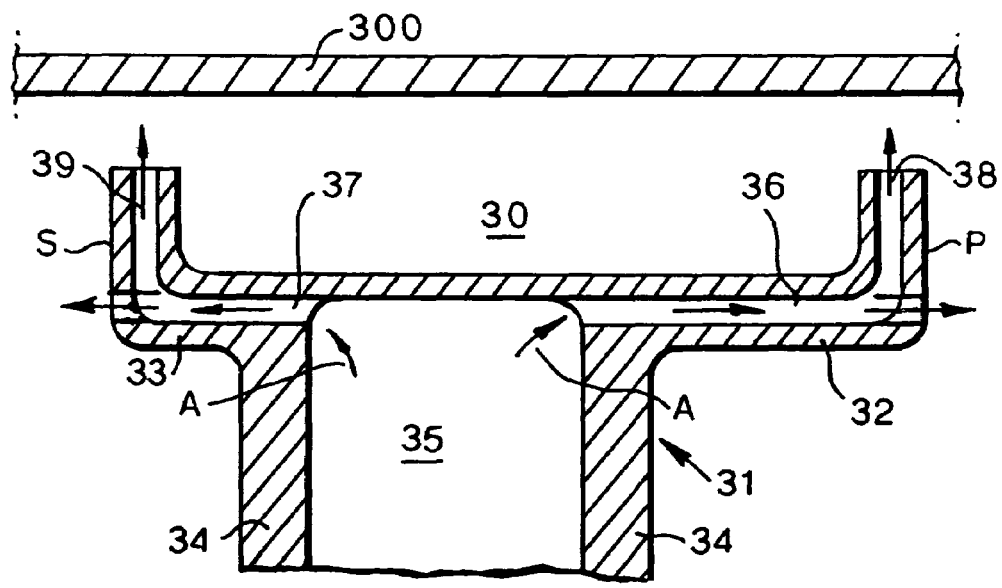
FIG. 3B is a schematic cross-section of an alternative rotor blade tip arrangement in accordance with a first embodiment of the present invention.

The optimum apertures 38, 39 must be determined based on the specific conditions experienced by each winglet 32, 33 in a given application. FIG. 3 shows all the basic cooling concepts that might be applied, but not necessarily all together. Thus one optimum design, as illustrated in FIG. 3B, may be for the coolant holes to eject horizontally or laterally on the pressure side P of the winglet 32 whilst ejecting radially on the suction side S or suction side S cooling might not be needed at all.

FIG. 4 provides a further refinement with respect to at least the pressure side P of a rotor tip arrangement 41 in accordance with a second embodiment of the present invention. Thus, the arrangement 41 has an aerofoil wall 44 which extends to a winglet 42 with a coolant flow B entering a passage 46 in the winglet 42 in order to present coolant air D through an aperture 48 in the side of the upstanding section of that winglet 42. Thus, the coolant air B flows over an upper surface 43 of the upstanding winglet 42 section in order to mingle with any leakage flow from the pressure side P. In such circumstances a coolant film is developed over the upstanding portion of the winglet 42 and this in association with the convective cooling through the passage 46 in the winglet 42 as well as mingling of the coolant flow with any leakage flow causes cooling of the arrangement 41. As previously, a stationary casing 400 may also be cooled by impingement of the coolant flow B projected angularly through the aperture 48. The particular angle of the aperture 48 will be chosen by particular operational circumstances in order to develop the coolant film upon the upper section 43 of the upstanding portion of the winglet 42 in order to protect those parts from over-heating degradation.

In view of the above it will be appreciated that the passage network and apertures in accordance with rotor tip arrangements in accordance with the present invention can be arranged to present coolant air flow either laterally or perpendicularly or at an inclined orientation within the upstanding portions of winglets. FIG. 5 provides an isometric view of a rotor blade incorporating a rotor blade tip arrangement 51 in accordance with the present invention. It will be seen on the pressure side P there are apertures 58 in the winglet 52 which are arranged in a row of radially ejecting coolant holes in order to present coolant flows as described previously. Similarly, other apertures 158 on the pressure side P are arranged in rows which are laterally horizontal or angularly inclined relative to a gutter channel 50. On a suction side S a winglet 53 incorporates apertures 59 in a row of radially ejecting coolant holes again to provide enhanced cooling function about the rotor blade tip arrangement 51 for operational efficiency.

Figure 6:
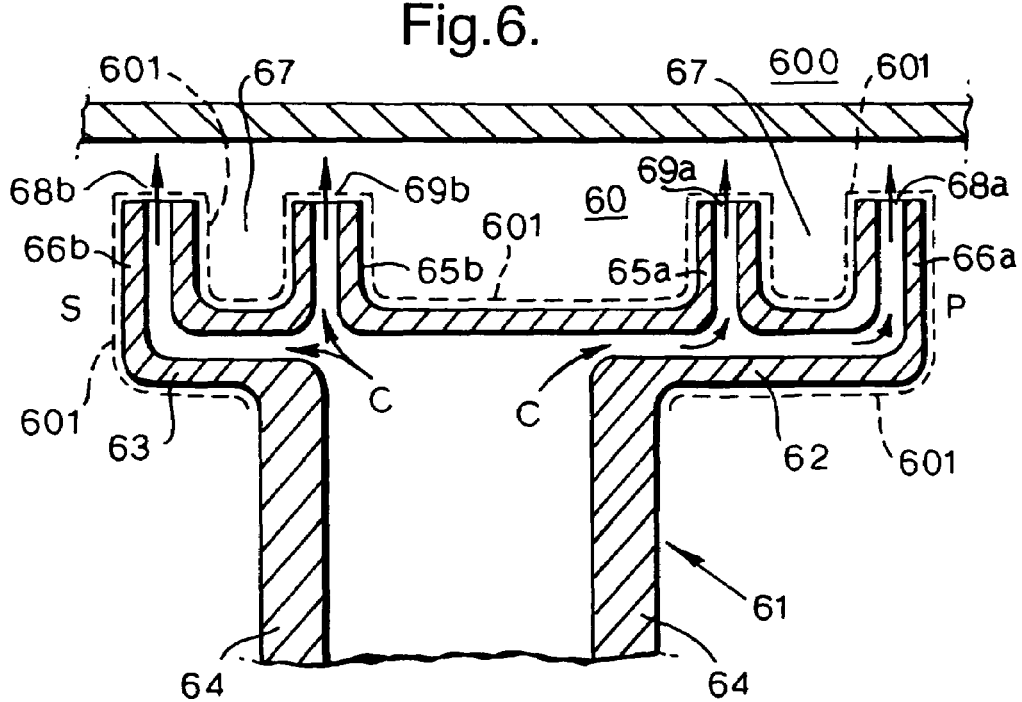
FIG. 6 is a schematic cross-section of a rotor tip arrangement in accordance with a third embodiment of the present invention.

In order to further improve resistance to leakage flow from the pressure side to the suction side of a turbine blade it is known to provide additional side cavities or trenches on either side of the open ended gutter channel. FIG. 6 illustrates a third embodiment of the present invention in which such side cavities or trenches 67 are provided. Thus, an arrangement 61 comprises turbine aerofoil walls 64 from which winglets 62, 63 extend in order to present upstanding portions incorporating apertures 68a, 68b, 69a, 69b. Coolant air flow C passes through passages in the arrangement 61 in order to present coolant air flow towards a stationary casing 600. As can be seen, an open ended gutter channel 60 is defined between two central upstanding portions 65a, 65b of the winglets 62, 63 whilst cavity winglet sections 66a, 66b define the side cavities or trenches 67.

FIG. 6 shows how convective cooling in the form of radial holes or apertures 68a, 68b, 69a, 69b could be provided to each of the radial parts of the winglets 62, 63. Again, it should be pointed out that any combination of cooling in these parts might arise, depending on specific circumstances. Typically, cooling would be expected to always be needed on the extreme pressure surface side P, even if not needed for the other parts of the arrangement 61. In another case, it might be that direct cooling of the suction sides of the winglet 66b is not needed, but radial holes were still included in order to provide impingement cooling of the stationary casing 600 through apertures 68b, 69b. In another embodiment, the cooling holes 68a, 68b, 69a, 69b in any of these radial parts could be angled to the radial, similarly to that shown in FIG. 4.

It will be understood that cooling is a principal objective with respect to the cooling air flow C presented through apertures 68a, 68b, 69a, 69b, In the circumstance that the external gas temperature is above the required metal temperature, thermal barrier coatings may be provided in the areas marked by dotted line 601 in order to inhibit heat exchange to the winglet surfaces and thus facilitate cooling of the rotor tip arrangement 61. The form and method of application of such barrier coatings will be similar to those employed regularly on aerofoil sections, to facilitate their cooling.

Figure 7:
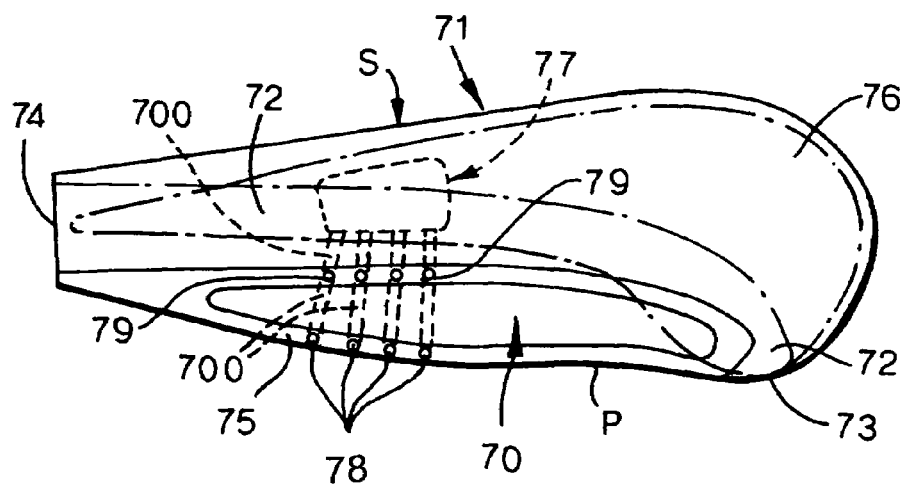
FIG. 7 is a schematic plan cross-section of a first coolant aperture arrangement.

FIG. 7 illustrates in schematic plan view a rotor tip arrangement 71 in accordance with the present invention. Generally, a gutter channel 72 extends from an opening at the leading edge 73 to a trailing edge 74. The gutter channel 72 expands progressively from the opening at the leading edge 73 with winglets 75 76 on either side of the channel 72. Within the rotor blade a cooling passage network or root 77 is provided from which passages 700 extend to apertures 78, 79 on either side of at least one side cavity 70 as described above with regard to FIG. 6. The winglet 75 is on the pressure side P of the turbine blade in order to present coolant flow through the apertures 78, 79 as described previously for cooling effect both internally via convection in the passages 700 and through mingling with any leakage flow over the arrangement 71 due to pressure differentials between that pressure side P and suction side S. As indicated previously, similar apertures and coolant passage networks may be provided in the suction sides, but as depicted in FIG. 7, adequate cooling can be provided simply by providing coolant ejection and presentation through apertures 78, 79 on the pressure side P of the turbine blade arrangement 71.

Figure 8:
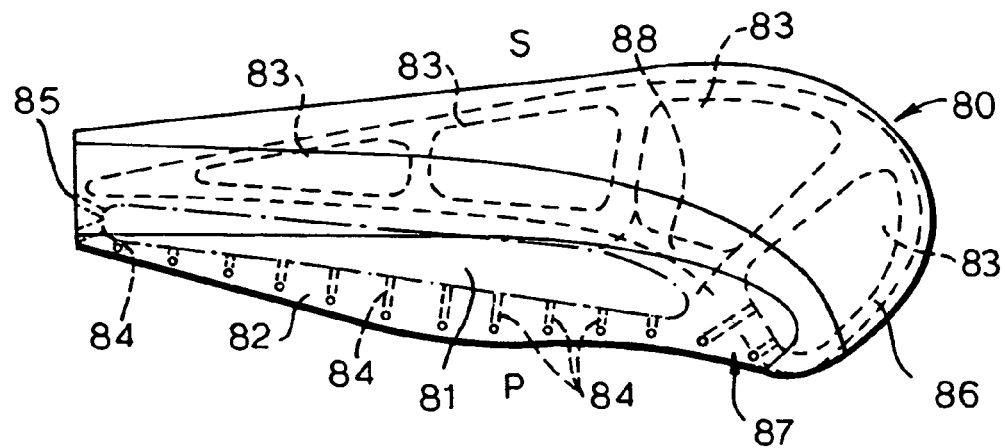
FIG. 8 is a schematic plan cross-section of a second coolant aperture arrangement.
Figure 9:
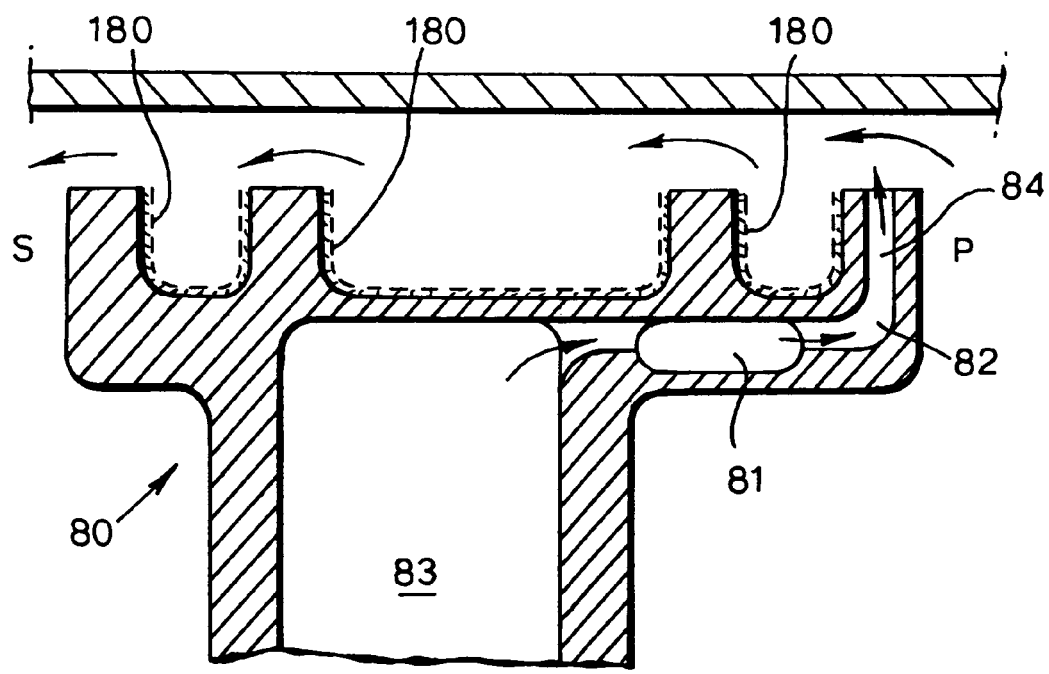
FIG. 9 is a schematic cross-section of a fourth embodiment of a rotor tip arrangement in accordance with the present invention.

FIGS. 8 and 9 illustrate a further embodiment of a cooling passage matrix or network in accordance with the present invention. In an arrangement 80 a chord-wise running gallery 81 is provided within the base of a winglet 82. This is fed by a radial passage 83 via a linking passage 88. The gallery 81 is large compared to the actual cooling holes or apertures 84, so pressure losses in the gallery 81 are minimized—but it provides much reduced cooling due to the lower flow velocities in it. The gallery 81 in turn feeds short horizontal cooling holes 84 most of which turn to flow radially and then eject flow at the pressure side P and at the tip of the winglet 82. A few holes 85 provide cooling of the trailing edge of the base of the winglet 82 and then simply eject flow horizontally. This particular embodiment is shown providing only cooling to the extremities of the pressure side P of the winglet 82. It should be understood that a similar arrangement could be provided on the suction side S, and could also provide cooling flow to holes in the other radial parts of the winglet if required.

In addition to the passage 83 and gallery 81 it will be appreciated that a further passage 86 is provided in order to feed coolant air to further leading edge holes or apertures 87 for particular cooling at this relatively hot portion of a rotor blade.

Figure 10:
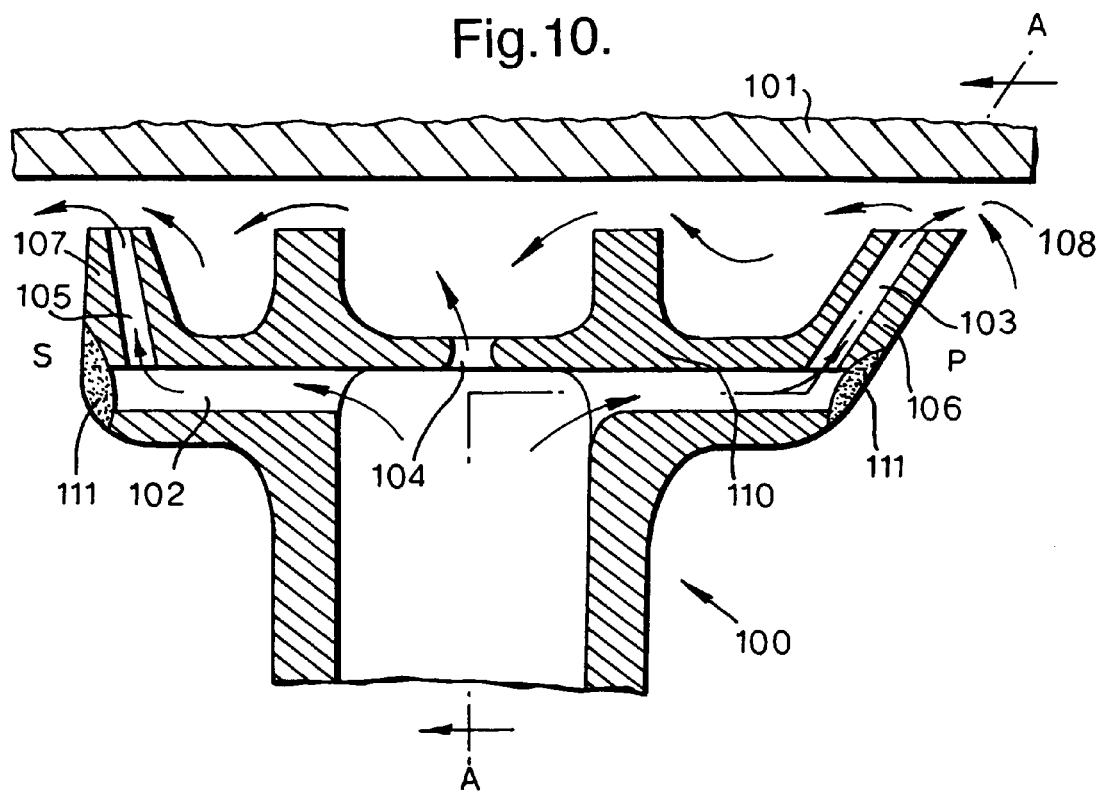
FIG. 10 is a schematic cross-section of a rotor tip arrangement in accordance with a fifth embodiment of the present invention; and, FIG. 11 is a schematic cross-section in the direction A-A depicted in FIG. 10.
Figure 11:
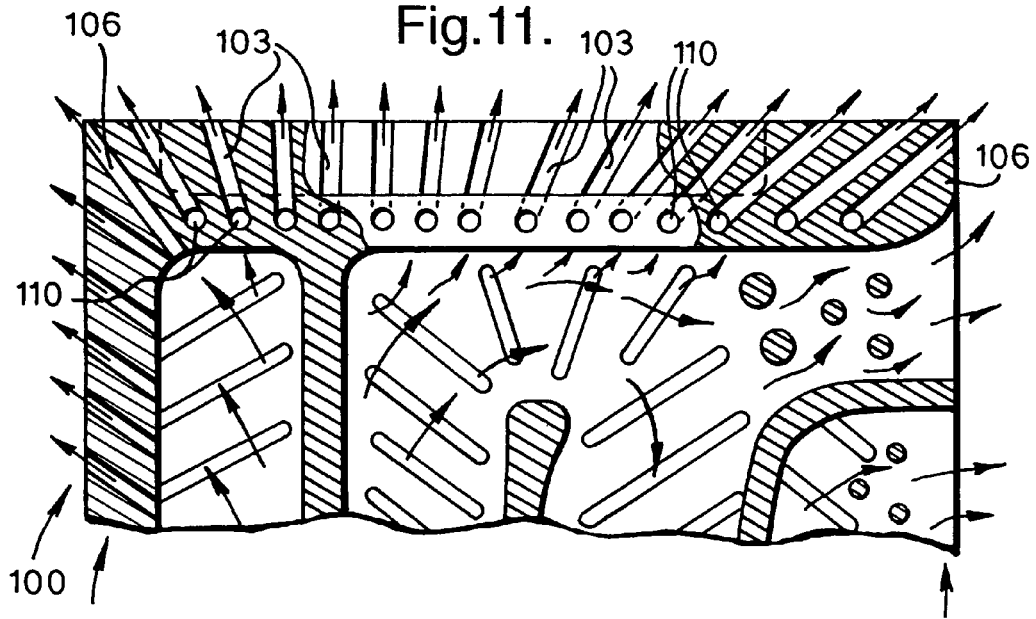

FIGS. 10 and 11 show a fourth embodiment of a rotor blade tip arrangement 100 in accordance with the present invention. FIG. 10 is a schematic cross-section of the arrangement 100 whilst FIG. 11 is a section along the line A-A depicted in FIG. 10.

A partial shroud 110 is provided with internal cooling holes 103, 105 in the extreme pressure side P and suction sides radial members 106, 107. These members 106, 107 are at an angle to the radial direction (although still substantially disposed in the radial direction). Typically the radial members 106, 107 are angled to point "into" the over tip flow (i.e. towards the pressure surface side). This is a well known principle used in some labyrinth seals, it results in a reduced discharge coefficient for the flow through the tip gap 108, thus reducing the over tip flow. In addition the cooling holes 103, 105 in these radial members 106, 107 are angled in the axial direction wherein the stationary casing 101 may be cooled by impingement of the coolant flow projected angularly through cooling holes 103, 105. This can be seen in section A-A, also shown in FIG. 11. It should be understood that this sort of arrangement 100 could apply to any of the embodiments shown previously. In this case it is preferable because it allows an even distribution of ejection holes 103 along the whole of the length of the tip of the pressure side P of the partial shroud 110 and similarly holes 105 along the suction side S, even though they are fed from internal cooling passages 102 that occupy a smaller chordal extent.

Fabrication of rotor tip arrangements in accordance with the present invention will typically be achieved through formation of the necessary passage network and cooling holes or apertures by casting or appropriate drilling. For example, with regard to the embodiment depicted in FIGS. 10 and 11 where horizontal lateral holes for presentation of coolant flow are not required, then a horizontal passage 102 may be drilled then the exits closed with welds 111 or alternative means of closing these drilled passages. Generally, the means by which the arrangements are formed will depend upon the feasibility for casting or drilling of the desired passage network and/or coolant aperture inclination within the upstanding winglet portion.

It will be understood that the rotor tip arrangement depicted in FIGS. 10 and 11 can be refined and will depend on the temperature of the gas flowing over the tips of the radial parts of the partial shroud 110 and of the flow through its "gutter" or central channel. These temperatures will be determined by the mixing of a number of different flows:

1. The main stream flow entering the opening at the leading edge of the gutter.
2. The main stream flow from the pressure side of the partial shroud that enters the gap between the tip of the pressure side wall and the casing.
3. Cooling air that is ejected from any "dust holes" 104 located at the outer radial extremities of the internal cooling passages.
4. Cooling air ejected from the pressure side of the partial shroud (whether through horizontal, angled or radial holes) that is carried over through the tip gap, entrained by the main stream flow leaking over the tip.

Where local gas temperatures are above the metal temperature needed to maintain the required mechanical integrity of the winglet, thermal barrier coatings may be applied to any of the sides and floors of the central channel or side pockets, or possibly to the tips of the radial members—to enhance the effectiveness of the internal convective cooling system.

The presented coolant air in accordance with the present invention acts as indicated to provide convective cooling as well as some film cooling effects where appropriate. In some situations the local gas temperatures might be brought below the target metal temperature, usually by mixing in enough ejected cooling air to sufficiently dilute the main stream flow over the tip. Then the internal convective cooling may be deleted from that area of the partial shroud and the tip or gutter flow will act to locally cool it. In this case means may be applied to enhance this cooling effect, such as:

a. Roughening the surface. In practice rather than roughening the surface, it might be better left in an "as-cast" state, and not be subject to polishing (as the rest of the aerofoil normally would be in its manufacture).
b. Incorporating flow turbulators on the surface. In practice this would usually not be applied to tips, but to the sides and floors of the central channel and any side pockets. The turbulators may be in the form of raised transverse ribs, undulations in the surface or small fins of circular, oval, elliptical or rhomboid plan shape. It will be up to the designer to determine the size of these features but obviously they must be smaller in height that the depth or width of the central channel or side pockets, otherwise they would block them. Typically they would cause a blockage to any chord-wise flow through them of 10% or less of the depth/width of the pocket or channel they were located in.

The areas where such means of heat transfer enhancement may be applied to the exposed upper surfaces of the partial shroud are illustrated in FIG. 9 by the dotted line 180.

It will also be understood that in accordance with known techniques, by appropriate presentation of coolant air it may be possible to locally "pinch" any leakage flow across the rotor tip arrangement from the pressure side to the suction side. In short, due to cross flow presentation of the coolant flow to the leakage flow there is a resistance to such leakage flow which may further enhance turbine operation.

Generally, as indicated above, in accordance with the present invention, rotor tip arrangements for rotor blades assembled to form a turbine stage in a turbine engine will be associated with a stationary casing surface. Thus, as the rotor blades with rotor blade tip arrangements in accordance with the present invention are turned upon a shaft, the coolant air flows through the apertures as described above with impingement upon that casing surface in order to provide some localised cooling of the casing. In such circumstances the present invention incorporates a turbine blade assembly comprising blades incorporating rotor tip arrangements in accordance with the present invention associated with casings. It will also be understood that such assemblies will typically be formed into banks or turbine stages within a turbine engine and in such circumstances the presented coolant flows through the apertures may add to the cooling efficiency within the overall turbine engine.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A rotor blade having an airfoil portion with airfoil exterior side walls, a tip edge and a tip arrangement, said rotor blade having an axis from said airfoil portion to said tip edge, said tip arrangement comprising an open ended gutter channel extending along said tip edge of said airfoil portion in order to inhibit leakage flow laterally across said gutter channel with respect to said axis, in use, said gutter channel being defined by winglets comprising passages, said winglets extending laterally, with respect to said axis, from said airfoil exterior side walls and having upstanding sections to define said gutter channel therebetween, said airfoil portion including a coolant air passage within said airfoil portion to supply coolant air to said winglet passages, said winglets having apertures to eject coolant air at the tips of said upstanding sections of said winglets to mingle with any leakage flow drawn across said gutter channel wherein said passages are configured to eject coolant air radially from said tip arrangement.

2. A rotor blade as claimed in claim 1 wherein the apertures are upstanding within the winglets.

3. A rotor blade as claimed in claim 1 wherein the apertures extend laterally across the winglets.

4. A rotor blade as claimed in claim 1 wherein the apertures are inclined relative to the channel.

5. A rotor blade as claimed in claim 1 wherein the apertures are coupled to a passage matrix within the tip arrangement connected to a coolant root network.

6. A rotor blade as claimed in claim 1 wherein the arrangement includes a side cavity or trench to one side of the channel defined by a cavity winglet.

7. A rotor blade as claimed in claim 6 wherein the arrangement includes at least one side cavity or trench to either side of the channel defined by a cavity winglet.

8. A rotor blade having an airfoil portion with airfoil exterior side walls, a tip edge and a tip arrangement, said rotor blade having an axis from said airfoil portion to said tip edge, said tip arrangement comprising an open ended gutter channel extending along said tip edge of said airfoil portion in order to inhibit leakage flow laterally across said gutter channel with respect to said axis, in use, said gutter channel being defined by winglets comprising passages, said winglets extending laterally, with respect to said axis, from said airfoil exterior side walls and having upstanding sections to define said gutter channel therebetween, said airfoil portion including a coolant air passage within said airfoil portion to supply coolant air to said winglet passages, said winglets having apertures to eject coolant air at the tips of said upstanding sections of said winglets to mingle with any leakage flow drawn across said gutter channel wherein the tip arrangement includes a side cavity or trench, on at least one side of the gutter channel, defined by a cavity winglet wherein the cavity winglet includes apertures to present coolant flow to mingle with any leakage flow across that side cavity or trench.

9. A rotor blade as claimed in claim 6 wherein the channel and/or cavity or trench incorporate heat transfer means.

10. A rotor blade as claimed in claim 9 wherein the heat transfer means comprises one of a coating and ribs in the surface of the channel or cavity to facilitate heat transfer to the coolant and leakage flow.

11. A rotor blade as claimed in claim 1 wherein the arrangement includes means for inhibiting heat transfer.

12. A rotor blade as claimed in claim 11 wherein the means for inhibiting heat transfer comprises a coating to a surface of the arrangement.

13. A rotor blade as claimed in claim 3 wherein the apertures eject coolant air laterally from said winglets.

14. A rotor blade as claimed in claim 1 wherein the apertures eject coolant air in an inclined orientation from said winglets.

15. A rotor blade assembly comprising a rotor blade arrangement as claimed in claim 1 adjacent to a casing and the apertures in the winglets thereof orientated towards that casing in order to present a coolant flow which pinches any leakage flow laterally across the rotor blade arrangement.

16. An assembly as claimed in claim 15 wherein the coolant flow cools upon impingement with the casing.

17. A turbine engine incorporating a rotor blade as claimed in claim 1.

18. A turbine engine incorporating a rotor blade assembly as claimed in claim 15.

* * * * *

UNITED STATES PATENT AND TRADEMARK OFFICE
CERTIFICATE OF CORRECTION

PATENT NO. : 7,632,062 B2  Page 1 of 1
APPLICATION NO. : 11/082665
DATED : December 15, 2009
INVENTOR(S) : Harvey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 749 days.

Signed and Sealed this

Second Day of November, 2010

David J. Kappos
*Director of the United States Patent and Trademark Office*